United States Patent [19]

Miwa et al.

[11] Patent Number: 5,030,354
[45] Date of Patent: Jul. 9, 1991

[54] SEPARATION AGENT FOR OPTICAL ISOMERS

[75] Inventors: Toshinobu Miwa, Takehayamachi; Teiichi Hattori, Inuyama; Masanori Tsuno, Takehayamachi; Masaki Ichikawa; Takeshi Miyakawa, both of Kakamigahara; Yasuo Miyake, Inuyama, all of Japan

[73] Assignee: Eisai Co., Ltd., Tokyo, Japan

[21] Appl. No.: 396,735

[22] Filed: Aug. 18, 1989

Related U.S. Application Data

[63] Continuation of Ser. No. 33,316, Apr. 1, 1987, abandoned.

[30] Foreign Application Priority Data

Apr. 2, 1986 [JP] Japan .................................. 61-74369

[51] Int. Cl.$^5$ .............................................. B01D 15/08
[52] U.S. Cl. .................................. 210/635; 210/656; 210/198.2; 210/502.1; 435/280; 435/815; 502/403
[58] Field of Search ............... 210/635, 656, 658, 659, 210/198.2, 502.1; 502/403; 435/280, 815

[56] References Cited

U.S. PATENT DOCUMENTS

| | | | |
|---|---|---|---|
| 3,886,043 | 5/1975 | Walker | 435/815 |
| 3,888,738 | 6/1975 | Okada | 435/815 |
| 3,983,001 | 9/1976 | Coupek | 435/815 |
| 4,020,268 | 4/1977 | Nishikawa | 435/213 |
| 4,045,552 | 8/1977 | Kutzbach | 435/815 |
| 4,157,323 | 6/1979 | Yen | 524/498 |
| 4,206,094 | 6/1980 | Yen | 524/24 |
| 4,714,768 | 12/1987 | Henklein | 530/402 |
| 4,722,917 | 2/1988 | Seno | 502/403 |

OTHER PUBLICATIONS

Hackh's Chemical Dictionary, Fourth Edition, McGraw-Hill Book Co., New York, 1972, 47.
Okamoto, The Chemical Society of Japan, 49th Spring Annual Meeting, Optical Resolution on Polymer, Mar. 10, 1984.
Chemical Abstracts, vol. 74, May 10, 1971, 95197j.
Weast, Handbook of Chemistry and Physics, 1971, C-358.
Hawley, The Condensed Chemical Dictionary, Van Nostrand, New York, 1971, p. 531.
Toshinobu Miwa et al, Direct Liquid Chromatographic Resolution of Racemic Compounds, Use of Ovomucoid as a Column Ligand, Pharmaceutical Bulletin, Jun. 6, 1986, pp. 682-686.

Primary Examiner—Ernest G. Therkorn
Attorney, Agent, or Firm—Flynn, Thiel, Boutell & Tanis

[57] ABSTRACT

A separating agent comprising ovomucoid and a carrier is useful to separate an optical isomer from a racemoid by way of chromatography.

5 Claims, 1 Drawing Sheet (CHLORPHENYLAMINE)

(CHLORPRENAMINE)

(α-ε-DIBENZOYLLYSINE)

SEPARATION AGENT FOR OPTICAL ISOMERS

This application is a continuation of U.S. Ser. No. 07/033,316, filed Apr. 1, 1987, now abandoned.

The invention relates to a separating agent comprising ovomucoid and a carrier and then a method for separating an optical isomer from a racemoid thereof by bringing said racemoid into contact with ovomucoid. This is useful in chemistry where separation of optical isomers is involved as a technical subject, especially in the field of medical and pharmaceutical products.

PRIOR ART

In the field of medical and pharmaceutical production, the separation of optical isomers has been strongly demanded for chiral chemical substances which contain asymmetric carbon atoms. That is, it has been made clear as a general fact that among plural optical isomers which constitute a racemoid, generally one isomer exhibits remarkable medical usefulness, for example, remarkable pharmacological virtue or remarkable bioavailability in the living body or, on the contrary, exhibits remarkable toxicity. Therefore, in order to increase the medical virtue, it is more reasonable to dose a medicine in a form of separated optical isomer than in a form of racemoid. That is the reason of the importance of the separation of optical isomers.

Many experimental methods have been presented for the separation of optical isomers for many years, but, among these methods, only a few are adoptable on industrial scale, and it has been considered to be very difficult technical problem. However, methods for the separation of optical isomers have become well known in general through the progress of column chromatography, especially of liquid chromatography. For example, the technology of chromatography is described in the following literatures.

(1) D. W. Armstrong et al: Journal of Chromatographic Science, Vol. 22 (1984) 411-415;

(2) Jörgen Hermansson: Journal of Chromatography, Vol. 325 (1985) 379-384;

(3) I. W. Wainer et al: Journal of Chromatography, Vol. 284 (1984) 117-124;

(4) S. Allenmark et al: Journal of Chromatography, Vol. 264 (1983) 63-68;

(5) S. Allenmark et al: Journal of Chromatography, Vol. 237 (1982) 473-477;

(6) U.S. Pat. No. 4,539,399; and (7) Japanese Patent Provisional Publication No. 60(1985)-41619. (1) discloses a method of separation using chiral cyclo-dextrin, and (6) discloses a method for separation using a solid phase which contains said cyclo-dextrin combined with silica gel. (2) discloses a technique which utilizes chiral $\alpha_1$-acidic glycoprotein, and (3) discloses a technique which utilizes (R)-N-(3,5-dinitrobenzoyl)phenylglycine. (4) and (5) disclose methods for separation using solid phases which contain bovine serum albumin which are combined with silica gel or agarose respectively. (7) discloses a method for separation which utilizes orosomucoid or functionally similar substances thereof.

However substances used in these techniques are generally expensive. In addition, these techniques are applied practically for separation mostly through liquid chromatography in which a great amount of solvent is used, therefore the substance to be used for separation must be stable to the deteriorative effect of the solvent, for example, albumin and orosomucoid can not satisfy this requirement sufficiently. The above-mentioned facts are drawbacks of the prior art.

SUMMARY OF THE INVENTION

Considering the above-mentioned problems, the inventors of the present invention has made various efforts in order to provide new techniques for the separation of optical isomers using substances which are relatively inexpensive and stable to deterioration by solvent. As a result, it was found that the purpose is achieved by using ovomucoid, which can be obtained from egg albumen as an inexpensive by-product, and this discovery has lead to the achievement of the present invention. Accordingly, the present invention discloses a method for the separation of optical isomers which is featured by using a solid phase containing ovomucoid combined to a carrier.

Figure 3:
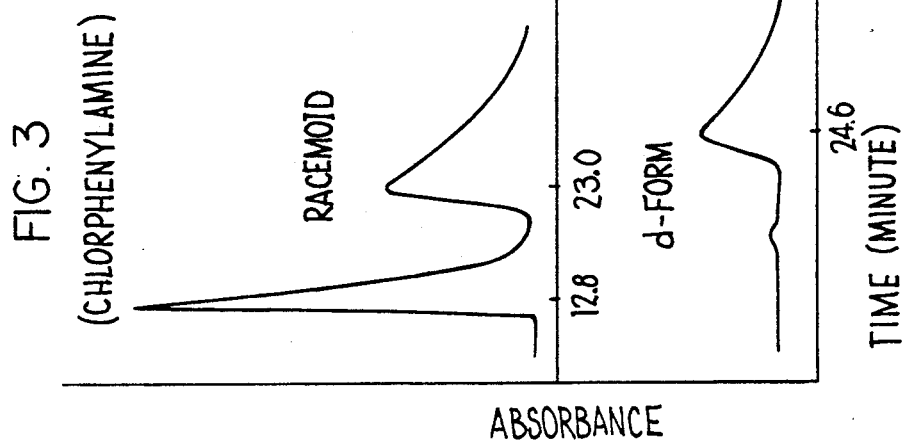
FIG. 3 shows liquid chromatograms of a racemoid and d-form of chlorphenylamine on the top and bottom sides, respectively.

The present invention is described hereinunder in detail.

DESCRIPTION OF THE PREFERRED EMBODIMENTS

Ovomucoid exists in egg albumen and is a glycoprotein having an isoelectric point of 3.9 to 4.5. Ovomucoid can be separated easily from other usual proteins because ovomucoid does not thermally coagulate and is not precipitated by trichloro-acetic acid. For example, to obtain ovomocoid, most proteins, excepting ovomucoid, are thermally coagulated by heat-treatment of egg albumen at 75° to 100° C. followed by the addition of ethanol to the supernatant liquid to precipitate and coalesce, or in an other method, 0.5M trichloro-acetic acid - acetone mixture (1:2 by volume) is added to the same amount of egg albumen, which is adjusted to the pH of 3.5 to precipitate other proteins, followed by the addition of acetone in an amount of 2 to 3 times the volume of supernatant liquid to the supernatant liquid to precipitate and collect it. Aside from the above-mentioned methods, ovomucoid can be separated easily also from the residual liquid of lysozyme or conalbumin production from egg albumen as by-product thereof. Accordingly, ovomucoid which is prepared inexpensively through such methods as described hereinbefore may be used, and by no means limited to the specifically prepared ovomucoid.

Any carrier which can combine with ovomucoid to form solid phase may be used. The separation of optical isomers of the present invention is carried out mainly through liquid chromatography, examples of the carrier include silica gel and Sepharose. The combination of ovomucoid to carrier can be carried out according to usual methods for forming solid phase. Examples of methods for combination include a method in which ovomucoid is combined to aminopropyl silica carrier using N,N-disuccinimidyl-carbonate as a cross-linking agent, a method in which ovomucoid is combined with a silica gel carrier using 3-glycidoxy-propyltrimethoxy silane as a cross-linking agent, or a method in which Sepharose (agarose) is activated by bromcyan and ovomucoid is combined to the activated Sepharose carrier. The essential point of the present invention is to use ovomucoid for the separation of optical isomers, therefore the present invention is by no means limited specifically by the method of combination with the carrier.

The separation agent of the present invention is featured by comprising a solid phase which is obtained by combining ovomucoid with a carrier. Therefore, in the separation agent of the present invention, said solid phase is contained as the essential constitutional component. In addition, in the separation agent, other components such as silica gel and cellulose may be added selectively, as desired, to improve the separation efficiency.

In the present invention, the optical isomer is referred to as a chiral compound having an asymmetric carbon atom in a molecule thereof, examples can be found in many medicines. For example, α-ε-dibenzoyllysine, chlorprenoline, chlorphenylamine, ascorbic acid, ampicillin, atropine, tocopherol, epinephrine, ethylephrine, ephedrine, quinine, phenylephrine, propranolol, methamphetamine, scopolamine, homatropine, methyldopa, verapamil are given as examples. In these substances, plural optical isomers, which are in the relation of reflected images exist, and the mixture of these optical isomers forms racemoids. The present invention provides a method for the separation of each optical isomer which constitutes these racemoids therefrom.

The separation agent of the present invention is mainly used in liquid chromatography. Therefore the separation agent is used according to the usual operation for liquid chromatography. For example, the separation agent of the present invention is packed in a column, a racemoid which contains optical isomers is charged thereinto, then mobile phases such as phosphoric acid buffer solution, aqueous ethanol solution, and isopropanol are flowed through the column, and the desired optical isomers are isolated by the difference of retention time.

EXAMPLES

The present invention will be described in detail referring to the following examples.

EXAMPLE 1

3 g of aminopropyl silica gel and 2 g of N,N-disuccinimidyl carbonate were added to 100 ml of 0.1M sodium hydrogencarbonate buffer solution (pH of 6.8), stirred over one night, poured onto a glass filter, and washed with water to prepare a suspension of activated aminopropyl silica gel. Separately, 2 g of ovomucoid was dissolved in 30 ml of 0.1M sodium hydrogencarbonate buffer solution (pH of 6.8) to prepare a ovomucoid solution, and the ovomucoid solution was added to the above-mentioned suspension to obtain a separation agent of the present invention. The separation agent was packed in a steel column to use as a column for the separation of optical isomers.

EXAMPLE 2

10 g of silica gel was dried at 140° C. for 24 hr, cooled, suspended in 140 ml of toluene, and 15 ml of 3-glycidoxypropyltrimethoxy silane was added, the mixture was heated and refluxing, low boiling point distillate was removed from the top after 5 hr. The mixture was poured onto a glass filter, washed with toluene, tetrahydrofuran, and methanol successively, and dried at 60° C. for 2 hr to obtain epoxy-activated silica gel. 5 g of the epoxy-activated silica gel was suspended in 50 ml of boric acid buffer solution with a pH of 8.5 and 500 mg of ovomucoid was added thereto, and allowed to react for 24 hr. The suspension was poured onto a glass filter, and washed with water to obtain a separation agent of the present invention. The agent was suspended in 20 ml of phosphoric acid buffer solution with a pH of 7.0 and the suspension was packed in a column to use for the separation of optical isomers.

EXAMPLE 3

Commercially avialable bromcyan-activated Sepharose 4B was added to 0.1M sodium hydrogencarbonate buffer solution (pH of 8.3) to swell, and ovomucoid was added thereto and mixed to obtain a separation agent of the present invention.

EFFECT OF THE INVENTION

The effect of the present invention will be made clear by the following experiments.

EXPERIMENT 1

Figure 1:
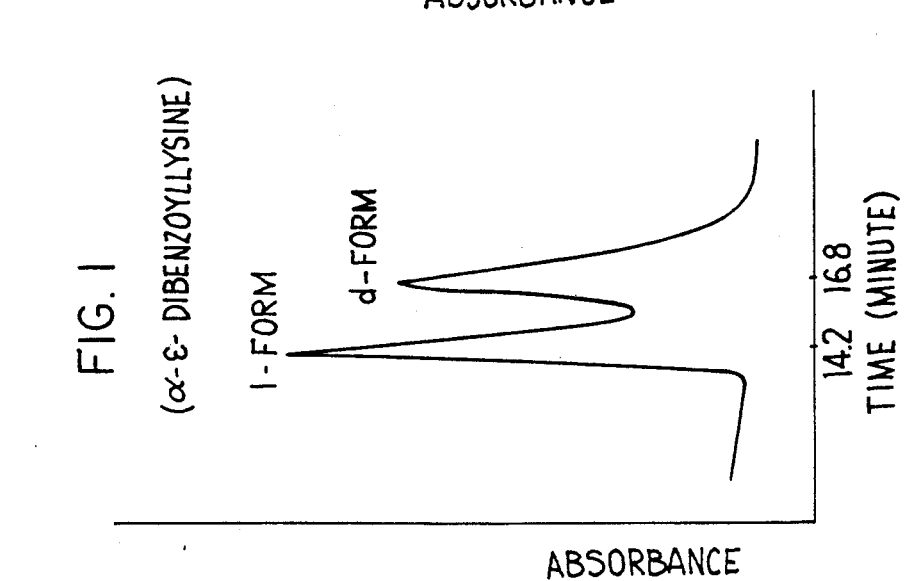
FIG. 1 shows a liquid chromatogram of an enantiomer of $\alpha$-$\epsilon$-dibenzoyllysine.

Enantiomer of α-ε-dibenzoyllysine was separated using the column for separation of optical isomers prepared in Example 1. 20 mM phophoric acid buffer solution ($K/K_2$) (pH of 6.0) was used as mobile phase, the flow rate was 1.0 ml/min. The result is shown in FIG. 1. From FIG. 1 it is obvious that each optical isomer is separated by the separation agent of the present invention.

EXPERIMENT 2

Figure 2:
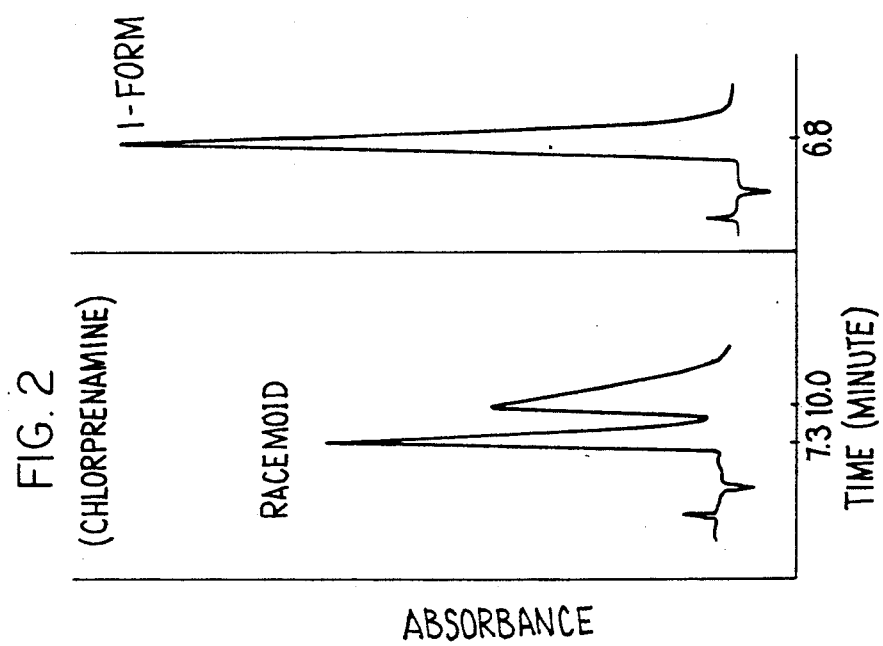
FIG. 2 shows liquid chromatograms of a racemoid and l-form of chlorprenaline on the left side and right side, respectively.

A racemoid of chlorprenaline was separated in the same manner as described in Experiment 1. As a reference, a chromatogram of l-form was obtained in the same manner. The detection was carried out at 210 nm. The result is shown in FIG. 2. The chromatogram of the racemoid is shown on the left side and the l-form is on the right side. From FIG. 2 it is obvious that each optical isomer is separated by the separation agent of the present invention.

EXPERIMENT 3

Racemoids of chlorphenylamine was separated in the same manner as described in Experiment 1. As a reference a chromatogram of d-form was obtained in the same manner. 20 mM phosphoric acid buffer solution ($K/K_2$) (pH of 5.5) was used as the mobile phase, the flow rate was 1.2 ml/min, and the detection was carried out at 220 nm. The result is shown in FIG. 3. The chromatogram of the racemoid is shown in the top and of the d-form in the bottom. From FIG. 3 it is obvious that each optical isomer is separated by the separation agent of the present invention.

What is claimed is:

1. In a method for separating an optical isomer from a racemoid thereof, the improvement comprising contacting said racemoid with a separation agent comprising solid phase containing ovomucoid combined with a carrier, wherein said carrier is aminopropyl silica gel and said ovomucoid is combined with said aminopropyl silica gel by using N,N-disuccinimidyl carbonate as a cross-linking agent.

2. The method of claim 1, wherein said method is performed in a liquid chromatography column.

3. The method of claim 1, wherein said racemoid is chlorprenaline.

4. The method of claim 1, wherein said racemoid is α-ε-dibenzoyllysine.

5. The method of claim 1, wherein said racemoid is chlorphenyl amine.

* * * * *